Nov. 12, 1957
J. A. MUNRO
2,812,949
FOLDING CONVERTIBLE STROLLER
Filed June 6, 1955
4 Sheets-Sheet 1
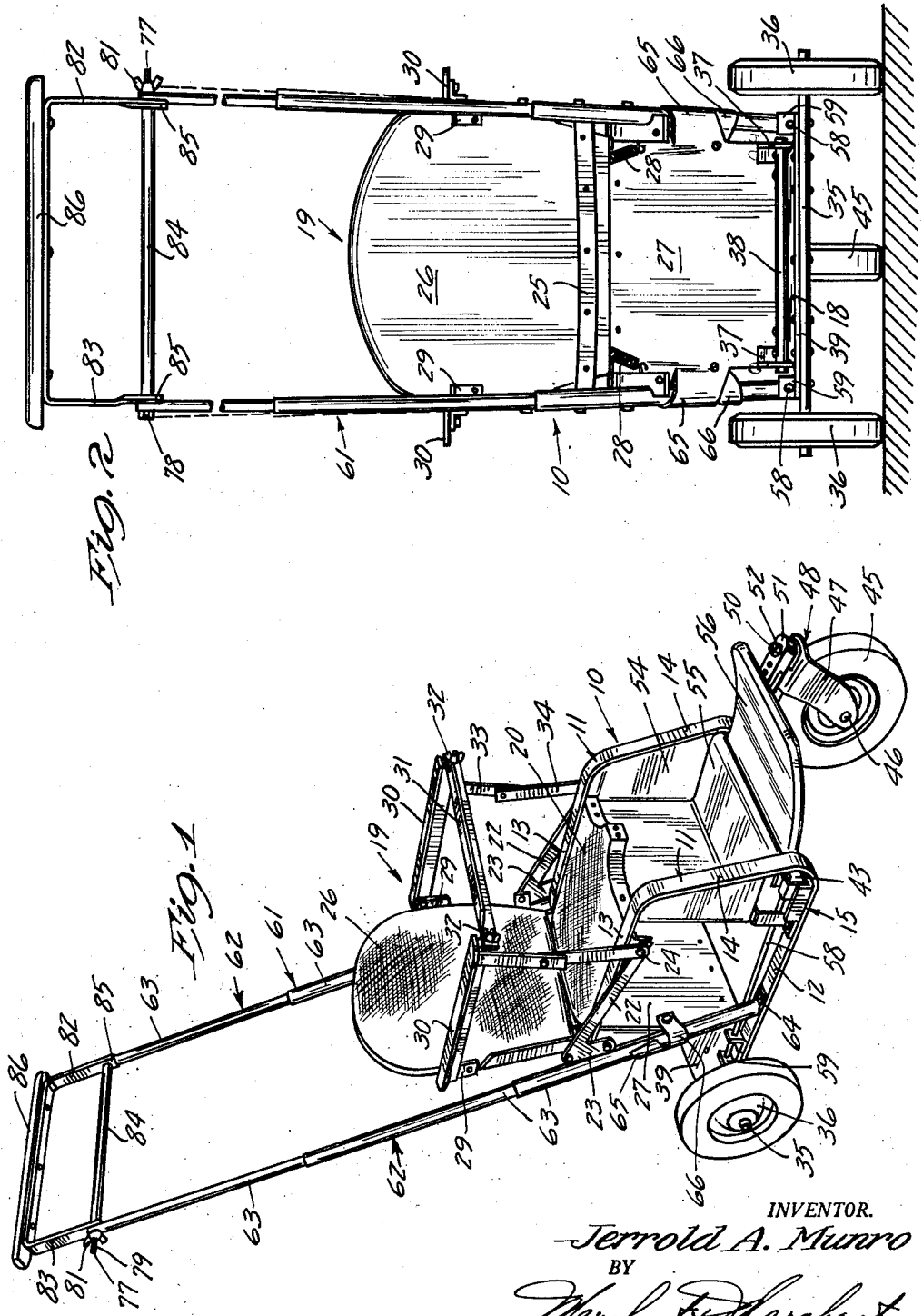
INVENTOR.
Jerrold A. Munro
BY
Merchant & Merchant
ATTORNEYS

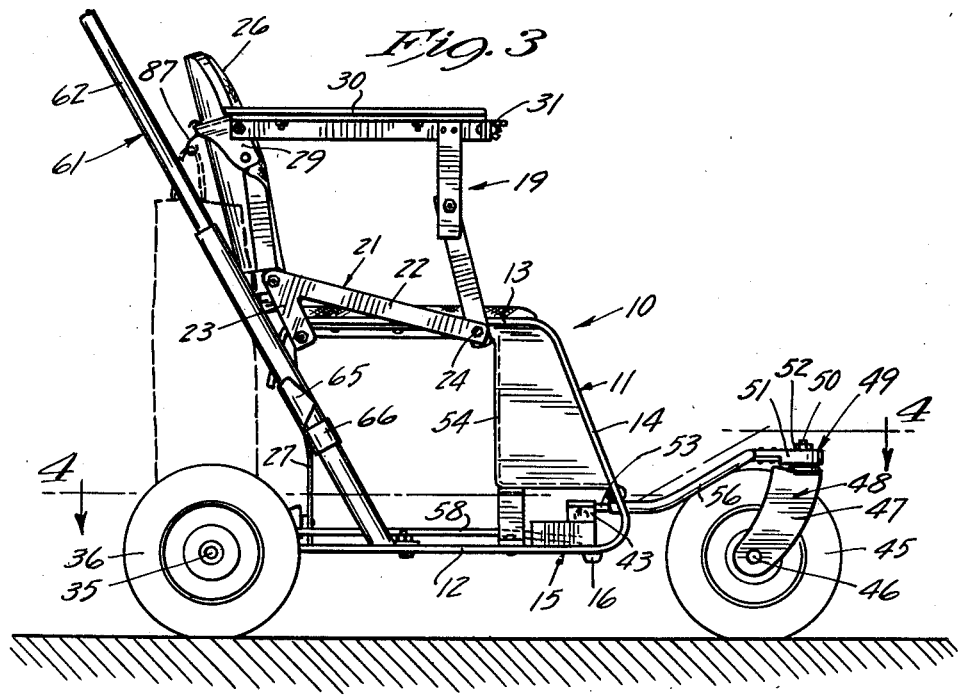
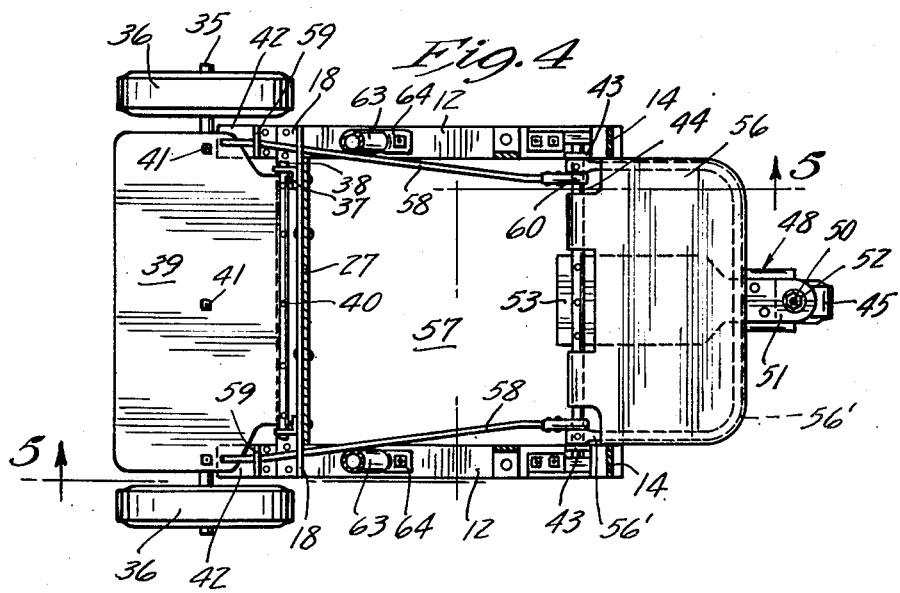

Nov. 12, 1957 — J. A. MUNRO — 2,812,949
FOLDING CONVERTIBLE STROLLER
Filed June 6, 1955 — 4 Sheets-Sheet 3
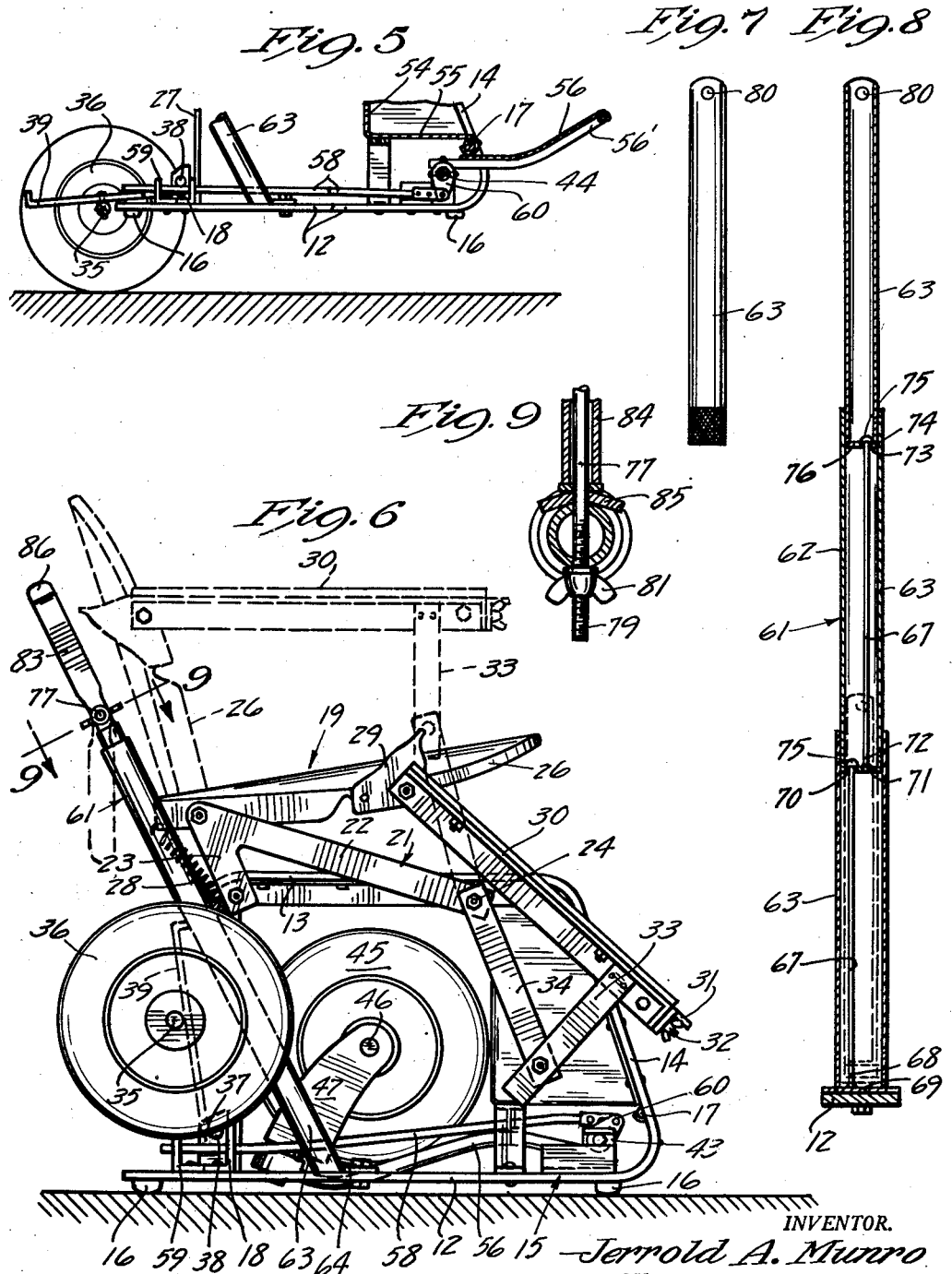
INVENTOR.
Jerrold A. Munro
BY
Merchant & Merchant
ATTORNEYS

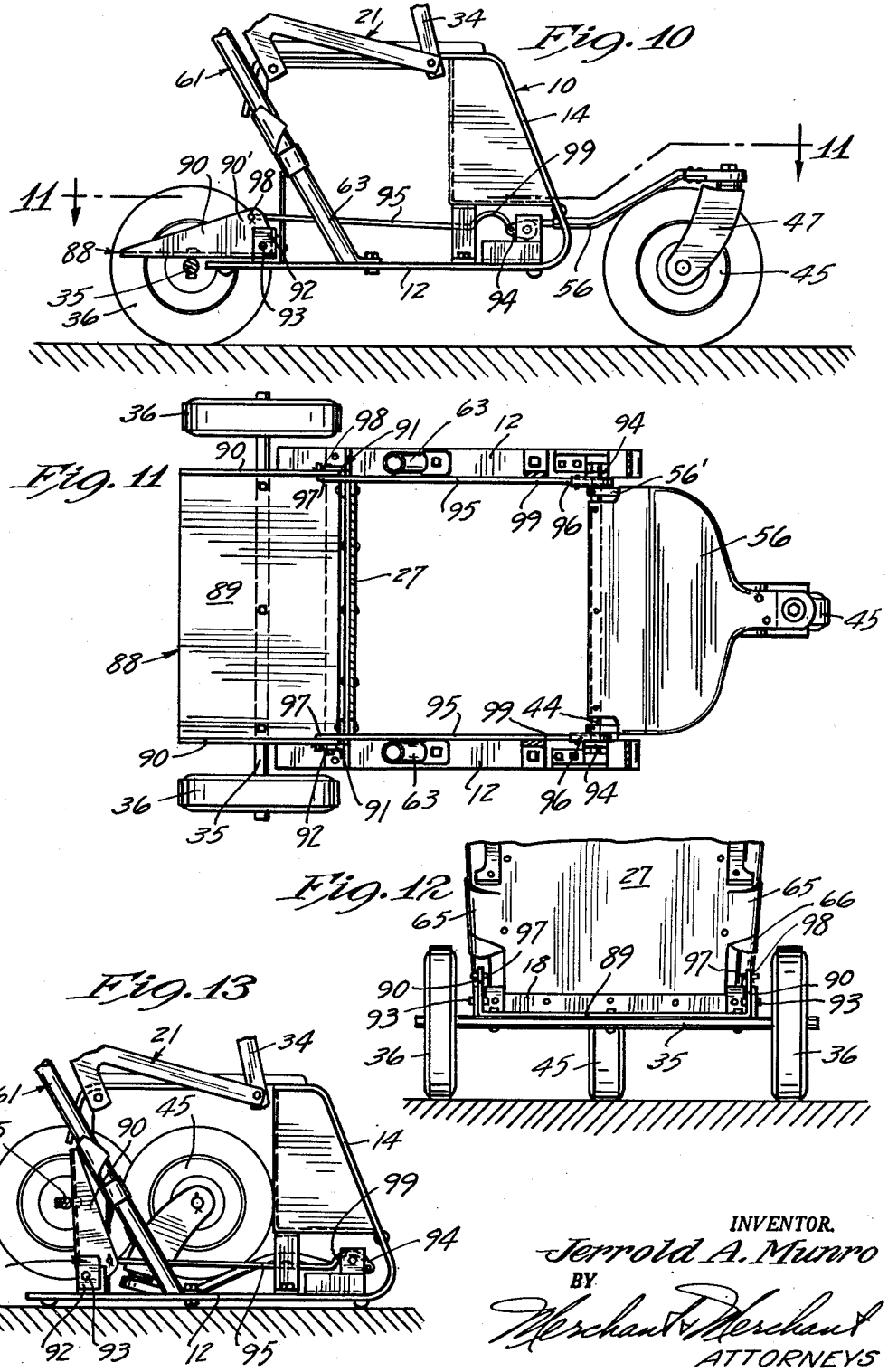

United States Patent Office 2,812,949
Patented Nov. 12, 1957

2,812,949

FOLDING CONVERTIBLE STROLLER

Jerrold A. Munro, St. Paul, Minn.

Application June 6, 1955, Serial No. 513,265

5 Claims. (Cl. 280—41)

My invention relates to baby carriages of the type generally known as a stroller.

The parents or those concerned with the raising of a baby or a small child, in most instances, must acquire several different pieces of equipment each serving a specific purpose; in particular, a stroller or carriage for wheeling the baby on a walk or the like, a car-seat for supporting the baby while riding in a car, a baby's chair which may be placed on an adult chair, bench or the like for supporting the baby at a height sufficient for him or her to be in a proper position at a normally sized table, or a baby's chair which may be positioned on the floor with the chair or seat portion thereof disposed adjacent the floor.

It is an object of my invention to provide a stroller which may accomplish all of the aforementioned functions of the previously named pieces of equipment. Thus, my novel and improved stroller provides for a considerable saving in space and in money by replacing a plurality of necessary baby equipment.

Another object of my invention is to provide a novel and improved stroller which may not only be used for wheeling a baby or small child but is also easily converted into a baby's car-seat or chair.

Another object of my invention is to provide a stroller of the class described in the aforementioned object in which the wheels of the stroller are pivotally swingable between supporting positions and inoperative positions whereby at the former the wheels support the frame structure and other parts of the stroller for wheeling movements and at the latter the wheels of the stroller are above the lowest limits of the frame structure and the stroller may be supported in a stationary position on any generally horizontal supporting surface, the latter being engageable by the frame structure of the stroller.

Another object of my invention is to provide a structure of the class described having a front wheel and a pair of spaced rear wheels and latching means for maintaining the rear wheels in their supporting positions, wherein the latching means are moved to unlatched positions during pivotal movement of the front wheel from its supporting position to its inoperative position, and are moved to latched positions during pivotal movement of the front wheel from its inoperative position to its supporting position.

Another object of my invention is to provide a structure of the class described having a front wheel and a pair of spaced rear wheels whereby the movement of the front wheel from its supporting position to its inoperative position acts to move the rear wheels from their supporting positions to their inoperative positions; and also, the movement of the front wheel from its inoperative position to its supporting position acts to move the rear wheels from their inoperative positions to their supporting positions.

Another object of my invention is to provide a stroller of the class described which is easily folded into a compact form, which takes little space and may be easily stored.

Another object of my invention is to provide a novel and improved stroller of the class described which is of durable rugged construction, safely and reliably operative, and which serves a multiplicity of functions.

It is another object of my invention to provide a stroller having a novel and improved foldable handle comprising a pair of parallel laterally spaced extendable and retractable arms which are formed of several progressively diametrically reduced sections that telescope one into another.

A further object of my invention is to provide my novel and improved stroller, which is easily converted into a baby's chair, with my improved handle of the class described in the aforementioned object so that the stroller when converted into a chair, may easily fit into a car to function as a car-seat and so that my stroller when used as a chair in a house will occupy a minimum of space and is a compact piece of furniture.

These and other objects of my invention will become apparent in the course of the following specification and claims, reference being had to the accompanying drawings wherein:

Fig. 1 is a view in perspective showing one modification of my invention adapted for use as a baby carriage;

Fig. 2 is a view in end elevation, with some parts broken away, of the structure shown in Fig. 1;

Fig. 3 is a view in side elevation, with some parts broken away, of the structure shown in Fig. 1;

Fig. 4 is a view partly in plan and partly in horizontal section as viewed in line 4—4 of Fig. 3;

Fig. 5 is a fragmentary view partly in elevation and partly in vertical section as viewed on line 5—5 of Fig. 4;

Fig. 6 is an enlarged view in side elevation showing the modification of Figs. 1–5 in a folded position wherein my invention is adapted to be used as a baby's chair;

Fig. 7 is a view in side elevation showing one of the sections of the foldable handle of my invention;

Fig. 8 is a view in vertical section of one of the extendable and retractable arms of the foldable handle of my invention;

Fig. 9 is an enlarged fragmentary view in horizontal section as viewed on line 9—9 of Fig. 6;

Fig. 10 is a fragmentary view in side elevation showing a second modification of my invention, wherein the wheels are in their supporting positions;

Fig. 11 is a view partly in plan and partly in horizontal section as viewed on the line 11—11 of Fig. 10;

Fig. 12 is a fragmentary view in end elevation of the structure shown in Fig. 10; and Fig. 13 is a fragmentary view in side elevation of the modification of my invention shown in Fig. 10, wherein the wheels are in their inoperative positions.

Referring more particularly to the drawings, wherein like parts will be indicated by the same numeral, the numeral 10 indicates in its entirety frame structure comprising a pair of parallel laterally spaced generally U-shaped frame members 11. Frame members 11 each comprise vertically spaced normally horizontally disposed rail portions 12 and 13 and a crossbar 14 which extends obliquely between the forward ends of rail portions 12 and 13, the forward end of rail portion 13 being slightly rearwardly disposed with respect to the forward end of rail portion 12. Frame structure 10 defines a chair-supporting base portion, indicated generally by the reference numeral 15, which comprises rail portions 12 of frame members 11 and depending rubber feet 16, two of which are anchored to each rail portion 12, by any suitable means, at opposite ends thereof. A generally horizontally disposed tubular strut or tie 17 connects the forward ends of frame members 11 and is anchored at its opposite ends to crossbars 14 of frame members 11 adjacent rail portions 12. A longitudinal extending angle bar 18 interconnects the rearward ends of frame members 11 and is anchored at its opposite ends, by any suitable means, to rail portions 12 adjacent the rearward ends thereof.

I provide structure indicated generally by the numeral 19 which is anchored to the frame structure 10 and forms a forwardly facing chair. More specifically, chair structure 19 preferably comprises a generally horizontal seat 20 disposed between frame members 11 and rigidly anchored to rail portions 13 thereof, by any suitable means, in vertically upwardly spaced relation to rail portions 12.

A pair of oppositely disposed connecting members 21 is rigidly anchored to seat 20 at opposite lateral sides thereof. Each connecting member 21 comprises a pair of integral angularly disposed bars 22 and 23, the intersection of which is disposed adjacent the rearward end of seat 20 slightly upwardly spaced therefrom. The free ends of bars 23 of oppositely disposed connecting members 21 are rigidly anchored to opposite sides of seat 20 adjacent the rearward end thereof by any suitable means, and the free ends of bars 22 are rigidly anchored to opposite sides of seat 20 adjacent the forward end thereof by bolts 24. A normally horizontally disposed slightly arcuate back-supporting bar 25 is pivotally anchored at its opposite ends to the oppositely disposed connecting members 21 at the intersections of bars 22 and 23 thereof. A back member 26 is rigidly anchored adjacent its lower end to back-supporting bar 25 for pivotal movement therewith between its upright operative position, shown in dotted lines in Fig. 6, and its generally horizontal folded position, shown in full lines in Fig. 6, wherein it generally overlies seat 20. A generally rectangular vertically disposed plate 27 is anchored adjacent its top edge to the rearward end of seat 20 and adjacent its lower edge to the upstanding flange of angle bar 18. A pair of helical compression springs 28 each have one end connected to plate 27 adjacent opposite sides thereof, and the other end connected to the lower end of back 26 adjacent opposite lateral sides thereof. Springs 28 urge back 26 to its operative upright position and maintain it at such position unless back 26 is forcibly moved against the bias of springs 28 to its generally horizontal folded position.

A pair of oppositely disposed mounting brackets 29 is anchored to opposite lateral sides of back 26 intermediate the top and bottom thereof and generally at a proper chair-arm height for a baby or small child seated in chair structure 19. Two laterally spaced, parallel, longitudinally extending arm-forming members 30 are pivotally connected adjacent their rearward ends each to a different one of the mounting brackets 29. A safety bar disposed at right angles to arm-forming members 30 extends between and is releasably anchored to the forward ends of arm-forming members 30 by a bolt and wing-nut, indicated together by the numeral 32, at each end thereof. Safety bar 31 acts to hold a small baby in the chair structure 19 but may be removed if desired. Two laterally spaced parallel supporting links 33 are rigidly anchored at their upper ends each to a different one of the arm-forming members 30 at right angles thereto adjacent the safety bar 31 and at their opposite lower ends are pivotally connected to cooperating supporting links 34. The opposite lower ends of supporting links 34 are pivotally connected each to a different one of the free ends of bars 22 by the bolts 24. Each pair of cooperating links 33 and 34 act to support the forward end of one of the arm-forming members 30. Arm-forming members 30 and supporting links 33 and 34 associated therewith are movable with back 26 between the positions shown in dotted and full lines in Fig. 6, where at the upright operative position of back 26 arm-forming members 30 are generally horizontally disposed and each pair of cooperating links 33 and 34 is generally vertically disposed, as shown in dotted lines in Fig. 6, and at the generally horizontal folded position of back 26 arm-forming members 30 and connecting links 33 and 34 may be folded to the positions shown in full lines in Fig. 6 wherein safety bar 31 may be moved into engagement with crossbars 14. Thus, chair structure 19 is pivotally movable from a normally operative position to a compact folded position.

I have shown a preferred embodiment of chair structure 19; however, as it does not involve the novel and improved features of my invention any other suitable chair structure might be substituted, such as a canvas seat and/or back, and a tray might be substituted for the removable safety bar 31.

A normally generally horizontally disposed axle 35 extends at right angles athwart the stroller and generally at right angles to fore and aft extending rail portions 12. As shown in Figs. 2 and 4, axle 35 extends laterally beyond the limits of rail portions 12 and has a pair of laterally spaced wheels 36 mounted thereon for rotation with respect to frame structure 10. Preferably, wheels 36 are journaled on axle 35, one at each end thereof laterally outwardly of the adjacent rail portion 12, for rotation with respect thereto. Conceivably, wheels 36 might be fixedly mounted on axle 35 for rotation therewith and axle 35 might be journaled for rotation with respect to frame structure 10. Axle 35 is connected to frame structure 10 and specifically to rail portions 12 thereof for limited pivotal swinging movements between a supporting position and an inoperative position. Means connecting axle 35 to frame structure 10 preferably comprise a pair of laterally spaced bearing brackets 37 which are rigidly anchored to angle bar 18 and which journal a normally horizontally disposed shaft 38, disposed generally between rail portions 12 at right angles thereto in vertically upward spaced relation with the horizontal flange of angle bar 18, and a plate-like connecting link 39. Connecting link 39 is rigidly anchored at its forward end to shaft 38 by rivets 40 or by any other suitable means such as welding or the like; and connecting link 39 is rigidly anchored intermediate its ends to axle 35 by bolts and nuts 41 or any other suitable means, such as welding, rivets or the like.

At its supporting position, axle 35 is disposed in generally horizontal alignment with rail portions 12 and wheels 36 extend below base portion 15 of frame structure 10. At the supporting position of axle 35, plate-like connecting link 39 is generally horizontally disposed and it forms a rear platform; also a portion thereof adjoins the rearward ends of rail portions 12 in overlying relationship, as indicated by the numeral 42 in Fig. 4. Axle 35 is pivotally swingable from its supporting position generally upwardly and forwardly about the axis defined by shaft 38 to its inoperative position, Fig. 6, wherein axle 35 is vertically upwardly spaced from rail portions 12 a distance greater than the radius of wheels 36 so that wheels 36 are disposed above the lowest limits of rail portions 12 and base portion 15 at the inoperative position of axle 35. At the inoperative position of axle 35, plate-like connecting link 39 is generally vertically disposed adjacent and rearwardly of plate 27; and axle 35 is maintained at its inoperative position by the friction in the journaling of shaft 38 in bearing brackets 37.

Oppositely disposed bearing brackets 43 are rigidly connected by bolts or any other suitable means, each to a different one of the rail portions 12 adjacent the forward ends of the latter; and bearing brackets 43 journal a generally horizontal shaft 44 disposed in forwardly spaced parallel relationship with rearward shaft 38.

I provide a front wheel 45 of approximately the same diameter and size as wheels 36. Wheel 45 is of a type generally known as a caster wheel, and it is journaled for rotation on shaft 46 which is rigidly anchored at its opposite ends to the free ends 47 of a depending inverted U-shaped bracket 48. A swivel union, indicated generally by the numeral 49, mounts wheel 45 for swivel movements about an axis perpendicular to shaft 46 and comprises two relatively movable parts, one being a spindle 50 which is rigidly anchored to the cross-piece connecting depending arms 47 of bracket 48 and the other being a sleeve 51 which encompasses and journals spindle 50. Nut 52 threaded on the end of spindle 50 secures it against axial movements with respect to sleeve 51. Sleeve 51 is rigidly anchored at one end to a connecting link 53 which at its opposite end is rigidly anchored to shaft 44 generally centrally between rail portions 12.

Connecting link 53, shaft 44, and bearing brackets 43 form means connecting front wheel 45 to frame structure 10 adjacent the forward ends of rail portions 12 for pivotal swinging movements between a supporting position, shown in Figs. 1–4, and an inoperative position, shown in Fig. 6. At its supporting position, front wheel 45 is disposed forwardly of frame structure 10 generally centrally between frame members 11 thereof, and at this position of wheel 45, shaft 46 is generally horizontally aligned with axle 35. As front wheel 45 is substantially the same diameter as wheels 36, it will extend below base portion 15 and rail portions 12 at its supporting position a distance substantially equal to the distance wheels 36 extend below base portion 15 and rail portions 12 at the supporting position of axle 35; so that at the supporting positions of axle 35 and front wheel 45, wheels 45 and 36 support the stroller, as shown in Figs. 1–3, for wheeling movements.

An apron 54, forming a generally horizontally disposed foot rest 55, is anchored adjacent its top to the bottom of seat 20 and is anchored adjacent the rearward edge of foot rest 55 to rail portions 12 rearwardly of bearing brackets 43 and a portion is wrapped around strut 17 at the forward edge of foot rest 55. A fender member 56 is anchored to a U-shaped frame 56' and at the supporting position of front wheel 45 forms a forwardly extending foot rest extension having a width substantially equal to the distance between frame members 11. U-shaped frame 56' is rigidly anchored at the free ends of the parallel arms thereof to shaft 44 by any suitable means, see Fig. 4, and is rigidly anchored to connecting link 53 adjacent sleeve 51 for movements in common with connecting link 53 and shaft 44 about the axis defined by shaft 44. Strut 17 limits pivotal movements of front wheel 45 in one direction from its supporting position, and specifically, fender member 56 abuts that portion of apron 54 wrapped around strut 17 in underlying relationship at the supporting position of front wheel 45, as clearly shown in Fig. 5.

Pivotal movement of front wheel 45 rotates shaft 44 in bearing brackets 43, and front wheel 45 together with fender 56, frame 56' and connecting link 53 are pivotally swingable about the axis defined by shaft 44 rearwardly in a clockwise direction initially downwardly and then upwardly to dispose front wheel 45 at its inoperative position as shown in Fig. 6.

Base portion 15 defines an opening indicated by the numeral 57 underlying seat 20; and front wheel 45, connecting link 53, fender 56 and frame 56' are pivotally swingable about the axis defined by shaft 44 between rail portions 12 through opening 57 to dispose front wheel 45 beneath seat 20 at its inoperative position. Front wheel 45, connecting link 53, fender 56 and frame 56' are disposed above the lowest limits of base portion 15 at the inoperative position of front wheel 45, as shown by Fig. 6.

I provide releasable latching means for maintaining axle 35 at its supporting position comprising a pair of longitudinally extended rods 58. Rods 58 are connected to frame structure 10 for longitudinal movements between latched positions and unlatched positions dependent upon the position of front wheel 45. Preferably, rods 58 are disposed in upwardly spaced relation to rail portions 12, each adjacent a different one of the rail portions 12; and rods 58 each extend through a pair of horizontally aligned longitudinally spaced apertures, one being one of two apertures formed at opposite ends of angle bar 18, in the vertical upright flange thereof, and the other being formed in the vertical upright flange of one of a pair of oppositely disposed L-shaped mounting brackets 59, each having its horizontal flange rigidly connected to one of the rail portions 12 rearwardly of angle bar 18.

Brackets 59 are disposed adjacent the rearward ends of rods 58, and the forward ends of rods 58 are each pivotally connected to a different one of a pair of cranks or eccentric discs 60. Cranks 60 are rigidly anchored to shaft 44 adjacent opposite ends thereof for movement therewith; and the movement of front wheel 45 between its supporting position and its inoperative position moves cranks 60 between the two positions shown in Figs. 5 and 6, respectively, which moves rods 58 longitudinally between the positions also shown in Figs. 5 and 6 which are termed respectively their latched positions and their unlatched positions. As shown in Fig. 4, at the latched positions of rods 58, their rearward ends overlie the portions of plate-like connecting link 39, indicated by the numeral 42, to prevent pivotal upward movement of connecting link 39 and axle 35 from the supporting position of the latter until rods 58 are moved to their unlatched poistions. At the unlatched positions of rods 58, they are disposed forwardly of the enlarged portion of connecting link 39, and the latter is then movable generally upwardly and forwardly about the axis defined by shaft 38.

I provide a folding handle member indicated in its entirety by the numeral 61 which comprises a pair of parallel laterally spaced extending and retractable arms 62. Referring in particular to Figs. 7 and 8, each of the arms 62 comprises several, preferably three, successively diametrically reduced tubular sections, each indicated by the numeral 63. The lowermost section 63 of each of the arms 62 has an outwardly projecting ear 64 formed therewith. Ears 64 are adapted to be horizontally disposed and rigidly anchored by means of bolts or any other suitable means, each to a different one of the rail portions 12. Each of the lowermost sections 63 is further supported in a generally upwardly and rearwardly extending position by the loops 65 and 66, the former being integrally formed with plate 27 and the latter being rigidly connected thereto.

I provide means connecting adjacent sections 63 limiting relative extending movements thereof comprising a plurality of elongated, headed, pin-like connecting members 67. Each of the connecting members 67 is mounted in one of the sections 63 for relative extending and retracting movements with respect to the next adjacent section 63.

As both of the arms 62 are identical in construction and operation, the description hereinafter will be limited, for clarification, to the one arm 62 shown in Fig. 8. A connecting member 67 is mounted in the lowermost section 63 in parallel relation to the axis thereof and radially inwardly of the sidewalls of all sections 63 of the same arm 62. It has its lower end 68 rigidly anchored to the lower end 69 of lowermost section 63, in any suitable manner; and it projects through aperture 70 formed in the bottom 71 of the next upwardly adjacent section 63 of the same arm 62 for extending and retracting movements with respect thereto. Similarly, another connecting member 67 is mounted in the next upwardly adjacent section to the lowermost section 63, hereinafter called intermediate section 63, in parallel relation to the axis thereof and radially inwardly of the sidewalls of all the sections 63 of arm 62. It has its lower end 72 rigidly anchored to the bottom 71 in spaced relation to aperture 70, in any suitable manner; and it projects through the aperture 73 formed in the bottom 74 of the next upwardly adjacent section 63 of the same arms 62 for extending and retracting movements with respect thereto. The upper ends of connecting members 67 terminate in heads 75, which are disposed in the next upwardly adjacent section 63 from the section in which the connecting member is mounted. Head 75 of the connecting member 67 mounted in the lowermost section 63 has a diameter greater than aperture 70 and head 75 of the connecting member 67 mounted in the intermediate section 63 has a diameter greater than aperture 73. The bottom 74 of the uppermost section 63 has an aperture 76 formed therein which is spaced from aperture 73 and is in longitudinal alignment with pin 67 mounted in the lowermost section 63. Aperture 76 has a diameter which is greater than head 75 of the pin 67 with which it is aligned so that the uppermost section 63 will telescope into the lowermost section 63. In folding each arm 62, the uppermost section 63 telescopes into the intermediate section and the connecting member 67 mounted in the intermediate section is retracted into the uppermost section 63 until at the maximum retracted positions of the uppermost section 63 and the intermediate section 63 of each arm 62, bottom 74 is adjacent bottom 71. Similarly, all of the sections 63 of the same arm 62 above the lowermost section 63 telescope into the latter. At the limit of extension of the arm 62, head 75 of pin 67 mounted in the intermediate section 63 engages the bottom 74 to limit extension between the uppermost section and the intermediate section and prevent further extending movements therebetween, and head 75 of the connecting member 67 mounted in the lowermost section 63 engages the bottom 71 of intermediate section 63 to limit extension between the lowermost section and the intermediate section and prevent further extending movement therebetween. The maximum extension of the arm 62 is shown in full lines in Fig. 8 and the maximum retracted positions of the telescoping sections 63 are shown in dotted lines in Fig. 8. The tubular sections 63 of each arm 62 with exception of the lowermost section are knurled adjacent their bottoms as shown in Fig. 7 for a purpose which will be subsequently explained.

Referring in particular to Figs. 1, 2 and 9, I provide an adjustable crossbar 77 having a head 78 at one end and being externally threaded at its opposite end 79. Crossbar 77, preferably, passes through horizontally aligned apertures 80, one formed adjacent the upper end of each of the uppermost sections 63 of arms 62, to extend between the uppermost sections 63 of arms 62 with the threaded end 79 extending beyond one of the arms 62 to receive an internally threaded wing nut 81 laterally outwardly of the adjacent one of the uppermost sections 63.

A generally U-shaped handle-extension member 82 has laterally spaced parallel arms 83 which are spaced, from the outer surface of one arm 83 to the outer surface of the other arm 83, a distance less than the distance between arms 62 when they are in parallel relationship. Handle-extension member 82 is pivotally mounted on crossbar 77 intermediate arms 62; and preferably, crossbar 77 passes through apertures formed in handle-extension member 82 adjacent free ends of arms 83. An elongated sleeve 84 encompasses crossbar 77 between laterally spaced arms 83 and is of a length substantially equal to the distance between arms 83. When wing nut 81 is threaded inwardly, it shortens the effective length of crossbar 77 between arms 62 and forces arms 62 together, between wing nut 81 and the head 78, until the ends of arms 83 engage the adjacent ends of sleeve 84 and arms 62 abut arms 83. Thus, arms 62 are drawn inwardly to the positions shown in full lines in Fig. 2 from their normal parallel positions shown in dotted lines in Fig. 2 which binds sections 63 of the arms 62 in their extended positions. The beforementioned knurled ends of the uppermost sections 63 and the intermediate sections 63 of arms 62 aid in binding the sections 63 in their extended positions. It is clear that arms 62 may be extended to any desired height and then locked in position by tightening wing nut 81. The free ends of arms 83 are curved laterally outwardly as indicated by the numeral 85 in Fig. 9, so that when wing nut 81 is tightened until arms 62 engage arms 83, handle-extension member 82 will be maintained against pivotally swinging movements and will be locked in its upwardly and rearwardly extending position, substantially coplanar with arms 62 and crossbar 77, as shown in Fig. 6. By loosening wing nut 81 until arms 62 are in parallel relationship, arms 62 may be easily folded into their maximum retracted positions. It is clear that each of the arms 62 may have more than the three sections 63 herein shown.

When the foldable handle 61 is in an extended position and when axle 35 and front wheel 45 are in their supporting positions, the stroller is adapted for wheeling movements much in the manner of well known strollers now on the market. However, by first moving front wheel 45 to its inoperative position, which moves rods 58 to their unlatched positions, and then moving axle 35 to its inoperative position, the stroller may be supported on any horizontal surface on the four feet 16 of base portion 15. By folding handle 61 to its maximum retracted position shown in Fig. 6, the stroller is now adapted for use as a car-seat, as a baby's chair adapted to be supported on the floor, or as a baby's chair which may be placed on an adult chair or bench for use in supporting the baby or small child at table height. For storage purposes, seat structure 19 may be collapsed in the manner aforementioned and handle-extension 82 may be pivoted downwardly until the handle crossbar 86 thereof engages the arms 62, wherein stroller 21 is folded into a very compact form to occupy a minimum of space.

Plate-like connecting link 39 forms a platform upon which an older child may ride when my stroller is used for wheeling a baby or small child. The older child may stand on the platform formed by connecting link 39 between the upwardly and rearwardly extending arm 62 and may either grasp the arm 62 or the top of back 29 for support. This is an important feature of my invention for if a parent is wheeling a baby for a substantial distance and wishes to take an older child along, the older child may ride on the stroller when he becomes tired of walking or when the parent wishes to move along at a faster rate than the older child is able to walk. It is also a great pleasure for the older child to ride on the stroller in this manner. Platform-forming connecting link 39 serves an additional purpose in that it may aid in supporting a large bag of groceries and the like, indicated in dotted lines in Fig. 3. The bag may be further supported from mounting brackets 29 by a pair of hooks 87, each of which engages the looped handle of the bag and one of the brackets 29.

Referring in particular to Figs. 10-13, I disclose a modification of my invention wherein I provide means for moving axle 35 between its supporting position and its inoperative position during the movement of front wheel 45 between its supporting position and its inoperative position.

Preferably, a U-shaped connecting link 88, comprising a plate-like intermediate portion 89 and a pair of upstanding oppositely disposed ear portions 90, is rigidly secured to axle 35 similar to the manner in which connecting link 39 was connected to axle 35 in the modification of my invention shown in Figs. 1 through 6. Connecting link 88 is, however, pivotally connected to frame structure 10 in a slightly different, although generally equivalent, manner than connecting link 39. In the modification of Figs. 10-13, I provide a pair of upstanding angle members 91, each having one of its vertical flanges rigidly anchored, by any suitable means, to the upright flange of angle bar 18 in laterally spaced relationship, wherein each of the angle members 91 are disposed adjacent a different one of the rail portions 12. The other upright flanges of angle members 91, indicated by the numerals 92, project rearwardly from the upright flange of angle bar 18 generally at right angles thereto to be disposed laterally outwardly of ears 90, each in juxtaposed relationship with a different one of the ears 90. Each of the flanges 92 has a pivot pin or stub shaft 93 associated therewith which extends through the adjoining ear 91 to mount connecting link 88 for pivotal movements about the axis defined by the axially aligned pivot pins 93. Pins 93 may be connected in position in any suitable manner; for example, they may be rigidly connected with their associated flanges 92 and journalled in the adjoining ears 90, or vice versa, or their opposite ends may be peened, or the like, to provide enlarged heads which prevent axial movement of the pins 93 but permit rotational movement thereof with respect to angle members 91 and ears 90. It is clear that this mounting means might comprise a single shaft instead of the spaced pivot pins 93; this single shaft might be either rigidly secured to connecting link 88 and journalled in angle members 91 or the equivalent thereof.

At the supporting position of axle 35, intermediate portion 89 is generally horizontally disposed and provides a platform similar in function to connecting link 39 of the first disclosed modification of my invention. Ear portions 90 are preferably of generally triangular shape which provides a pleasing and streamlined design, and at the supporting position of axle 35 are generally vertically disposed, each having its apex, indicated by the numeral 90', disposed upwardly beyond the pivotal axis of connecting link 88 which is defined by stub shafts 93. Ear portions 90 are laterally spaced a distance substantially equal to the distance between rail portions 12 with each disposed adjacent a different one thereof.

I provide a pair of laterally spaced crank members or eccentric discs 94 which are rigidly secured to shaft 44 for rotation therewith, with each being disposed between one of the bearing brackets 43 and the adjacent one of the free ends of frame 56'. A comparison of Figs. 4 and 11, particularly, shows a slight modification in the form of frame 56' and fender member 56 between the two modifications of my invention; however, these two elements have been given the same numerals in both of my modifications because they are substantially identical elements. I provide a pair of laterally spaced parallel longitudinally extending connecting rods 95 which are disposed in upwardly spaced relation to rail portions 12 with each adjacent a different one thereof laterally inwardly of lowermost sections 63 of arms 62. Connecting rods 95 are operatively connected between ears 90 and crank members 94 for longitudinal movement upon rotational movement of shaft 44 and crank members 94. Ends 96 of connecting rods 95 are each pivotally connected to a different one of the crank members 94 by pins or the like. The opposite ends 97 of connecting rods 95 are preferably turned laterally outwardly to provide pintle portions which project through apertures formed in the apexes 90' of ears 90 and are secured in position by cotter pins 98 at their outer ends. The upwardly bulging portions indicated by the numeral 99 of connecting rods 95, adjacent their ends 96, permits them to fit over shaft 44, which allows sufficient rotation of crank members 94 to obtain the proper extent of longitudinal movement of connecting rods 95.

Referring in particular to Fig. 10, wheel 45 and axle 35 are at their supporting positions and connecting rods 95 are at their limit of longitudinal movement in one direction. When the operator wishes to move wheel 45 and axle 35 to their inoperative positions to adapt my structure for use as a car seat or baby's chair, or to fold it into a compact structure, the front wheel is pivoted about the axis defined by shaft 44 from its position shown in Fig. 10 to its inoperative position shown in Fig. 13. It is clear that this movement of front wheel 45 rotates shaft 44, and therewith crank members 94 from their positions shown in Fig. 10 to their positions shown in Fig. 13. This rotation of crank members 94 moves connecting rods 95 from their limit of longitudinal movement in one direction to their limit of longitudinal movement in the opposite direction, which is a longitudinal movement between the two positions shown in Figs. 10 and 13. This longitudinal movement of connecting rods 95 pivots U-shaped connecting link 88 about its pivotal axis defined by stub shafts 93, from its position of Fig. 10, wherein intermediate portion 89 is generally horizontally disposed, to its position of Fig. 13, wherein intermediate portion 89 is generally vertically disposed. The position of connecting link 88 shown in Fig. 13 disposes axle 35 at its inoperative position, wherein wheels 36 are disposed above the lowest limits of base portion 15. It is clear that when the operator wishes to move front wheel 45 and axle 35 and wheels 36 from their inoperative positions to their supporting positions, that is, from the positions shown in Fig. 13 to the positions shown in Fig. 10, the operator merely grasps the front wheel mounting structure comprising frame 56' or fender 56 or adjoining parts, to move the front wheel 45 from its inoperative position to its supporting positions; and this will, of course, automatically move axle 35 and wheels 36 to their supporting positions through the rotation of crank members 94 and the longitudinal movements of connecting rods 95.

My invention has been built and tested in the forms herein shown and found to accomplish all of the aforementioned objects and advantages. It will be obvious to those skilled in the art that the invention may be modified by many substitutions and equivalents and that this disclosure is intended to be illustrative only; therefore, I intend to be limited solely by the scope of the appended claims.

What I claim is:

1. A stroller comprising frame structure defining a chair-supporting base portion comprising a pair of spaced rail portions extending fore and aft, chair structure comprising a generally horizontal seat rigidly anchored to said frame structure upwardly spaced from said rail portions and defining with said frame structure an open bottomed cavity underlying said seat, a normally generally horizontally disposed axle extending at right angles athwart the structure adjacent the rearward ends of said rail portions, a connecting link, means pivotally connecting said connecting link at one end thereof to said frame structure for pivotally swinging movements about a horizontal axis which is in forwardly spaced parallel relationship with said axle, said connecting link being rigidly secured to said axle whereby said axle is pivotally swingable about the pivot axis of said connecting link between a supporting position and an inoperative position, a pair of spaced wheels journaled on said axle for rotation with respect thereto, said wheels extending below said base portion at the supporting position of said axle and being disposed above the lowest limits of said base portion at the inoperative position of said axle, a front wheel, journaling means mounting said front wheel for rotation about a horizontal axis, a connecting link being rigidly secured to said journaling means, a shaft disposed in forwardly spaced parallel relationship with the pivotal axis of said first-mentioned connecting link, bearing means connecting said shaft to said rail portions adjacent the forward ends thereof, said second-mentioned connecting link being rigidly secured to said shaft for pivotal swinging movements about the axis defined by said shaft whereby said front wheel is pivotally swingable about the axis defined by said shaft between a supporting position and an inoperative position in said cavity wherein said front wheel underlies said seat and is disposed above the lowest limits of said base portion, an upstanding ear rigid with said first-mentioned connecting link, a crank member anchored to said shaft for rotation therewith, and a connecting rod between said crank and said ear whereby the movement of said front wheel between its supporting position and its inoperative position pivotally moves said first-mentioned connecting link through rotation of said crank member and longitudinal movements of said connecting rod to move said axis between its supporting position and its inoperative position.

2. In a stroller, chair supporting frame structure comprising a pair of laterally spaced parallel side frame members, chair structure comprising a generally horizontal seat rigidly anchored to said frame structure upwardly spaced from the lower limits of said frame members and defining therewith an open-bottomed cavity underlying said seat, a wheel, wheel mounting means connected to said wheel and supporting it for rotation and connected to said frame structure adjacent the forward lower limits thereof for limited pivotal swinging movements about a horizontal axis from a generally forwardly projecting position rearwardly initially downwardly and then upwardly for moving said wheel from an upright operative position forwardly of said frame structure and seat structure to an inverted inoperative position in said cavity wherein said wheel underlies said seat and is disposed above the lower limits of said frame structure, said mounting means comprising a plate-like fender member overlying said first mentioned wheel at the operative position thereof and forming a closure for the open bottom of said cavity at the inoperative position of said first mentioned wheel, rear wheel structure comprising an axle and a pair of spaced wheels carried by said axle adjacent opposite ends thereof, and link means connected to said rear wheel structure and connected to said frame structure adjacent the rearward lower limits thereof for limited pivotal swinging movements about a generally horizontal axis for moving said rear wheel structure from an operative stroller supporting position to an inoperative position upwardly spaced from the lower limits of said frame structure.

3. In a stroller, chair supporting frame structure comprising a pair of laterally spaced parallel side frame members, chair structure comprising a generally horizontal seat rigidly anchored to said frame structure upwardly spaced from the lower limits of said frame members and defining therewith an open-bottom cavity underlying said seat, a wheel, wheel mounting means connected to said wheel and supporting it for rotation and connected to said frame structure adjacent the forward lower limits thereof for limited pivotal swinging movements about a horizontal axis from a generally forwardly projecting position rearwardly initially downwardly and then upwardly for moving said wheel from an upright operative position forwardly of said frame structure and seat structure to an inverted inoperative position in said cavity wherein said wheel underlies said seat and is disposed above the lower limits of said frame structure, rear wheel structure comprising an axle and a pair of spaced wheels carried by said axle adjacent opposite ends thereof, and link means connected to said rear wheel structure and connected to said frame structure adjacent the rearward lower limits thereof for limited pivotal swinging movements about a generally horizontal axis for moving said rear wheel structure from an operative stroller supporting position to an inoperative position upwardly spaced from the lower limits of said frame structure, said link means comprising a plate-like member forming a platform at the operative supporting position of said rear wheel structure.

4. In a stroller, frame structure comprising a pair of laterally spaced frame portions having lower limits disposed in common generally horizontal planes and adapted to support the stroller in a relatively stationary position on a generally horizontal supporting surface, chair structure comprising a generally horizontal seat rigidly anchored to said frame structure upwardly spaced from the lower limits of said frame portions and defining therewith an open-bottomed cavity underlying said seat, a wheel, said seat being upwardly spaced from the lower limits of said frame portion a distance not less than the diameter of said wheel, wheel mounting and guiding means connected to said wheel and pivotally connected to said frame structure for limited pivotal swinging movements for moving said wheel from an upright operative position forwardly of said frame structure and seat structure to an inverted inoperative position in said cavity wherein said wheel underlies said seat and is disposed above the lower limits of said frame structure, rear wheel structure comprising an axle and a pair of spaced wheels carried by said axle adjacent opposite ends thereof, and means connecting said rear wheel structure to said frame structure adjacent the rearward lower limits thereof for mounting and guiding said rear wheel structure for movements between an operative stroller supporting position and an inoperative position upwardly spaced from the lower limits of said frame structure.

5. The structure defined in claim 4 in further combination with a connecting rod pivotally connected both to said rear wheel structure and said first mentioned wheel mounting and guiding means whereby the movement of said first mentioned wheel between its operative position and its inoperative position moves said rear wheel structure between its operative position and its inoperative position.

References Cited in the file of this patent

UNITED STATES PATENTS

| | | |
|---|---|---|
| 844,725 | Howell | Feb. 19, 1907 |
| 1,033,256 | Ludwig | July 23, 1912 |
| 1,125,934 | Beasecker | Jan. 26, 1915 |
| 1,470,151 | Dennen | Oct. 9, 1923 |
| 1,808,864 | Pinheiro | June 9, 1931 |
| 1,980,205 | Isola | Nov. 13, 1934 |
| 2,435,733 | Belyeu | Feb. 10, 1948 |
| 2,468,271 | Ostby | Apr. 26, 1949 |